United States Patent [19]

McKinney et al.

[11] 4,397,978

[45] Aug. 9, 1983

[54] FIRE SUPPRESSANT COMPOSITION AND USE THEREOF

[75] Inventors: Linda D. McKinney; Randall C. Jenkines, both of Lake Jackson, Tex.

[73] Assignee: The Dow Chemical Company, Midland, Mich.

[21] Appl. No.: 372,584

[22] Filed: Apr. 28, 1982

[51] Int. Cl.³ .................................................. C08L 75/08
[52] U.S. Cl. ..................................... 524/409; 521/123; 524/410; 524/590; 524/780; 524/875; 524/915
[58] Field of Search ............... 524/411, 409, 780, 875, 524/590, 915; 521/123

[56] References Cited

U.S. PATENT DOCUMENTS

| | | |
|---|---|---|
| 3,810,851 | 5/1974 | Norman et al. ...................... 521/123 |
| 3,978,011 | 8/1976 | Molbert ................................ 521/123 |
| 4,284,682 | 8/1981 | Tschirch et al. .................... 428/263 |
| 4,284,682 | 8/1981 | Frosch ................................. 428/263 |
| 4,287,309 | 9/1981 | Cobbledick ......................... 521/114 |

FOREIGN PATENT DOCUMENTS 688026  6/1964  Canada .............................. 521/123

OTHER PUBLICATIONS

U.S. Dept. of Commerce National Technical Information Service; Flame Retardant Formulations and Products Produced Therefrom; Pub. No. N78-27232.

*Primary Examiner*—Lewis T. Jacobs
*Attorney, Agent, or Firm*—J. G. Carter

[57] ABSTRACT

A fire suppressant composition is provided for particular use in polyurethane backed carpets for airplanes which suppressant comprises a combination of (1) an organic filler composition comprising (a) a hydrated alumina compound, (b) a hydrated zinc borate, (c) an inorganic lead-containing compound and (d) an inorganic antimony-containing compound and (2) a halogen-containing resin.

6 Claims, No Drawings

FIRE SUPPRESSANT COMPOSITION AND USE THEREOF

BACKGROUND OF THE INVENTION

The present invention concerns fire suppressant additive compositions for polyurethane unitary backing systems for carpets and the like and to such unitary backing systems containing such additive composition as well as to substrates backed therewith.

The polyurethane unitary backing systems currently employed in the carpet industry generally possess adequate dimensional stability, bundle wrap, tuft lock and pilling and fuzzing characteristics. However, these systems do not possess adequate fire suppressant characteristics which are required in flame specification for Airlines in Federal Aviation Regulation (FAR), Part 25, Section 25.853b (Airworthiness Standards) with the currently employed suppressant additives such as calcium carbonate, iron compounds and alumina trihydrate. For these applications, passing of a vertical flammability test at a minimum of 1550° F. by FSTM Standard 191, Method 5903.2 employing type B gas is required.

The present invention provides a synergistic fire suppressant additive system for use in polyurethane unitary backing systems which will pass the aforementioned vertical flammability test at 1550° F. and, in many instances, will pass this test at even higher temperatures.

SUMMARY OF THE INVENTION

The present invention is directed to a polyurethane composition for providing a unitary backing for tufted or woven carpets which comprises the catalyzed reaction product of a polyurethane forming mixture comprising (A) a relatively high molecular weight polyether polyol having an average of from 2 to about 8, preferably from 2 to about 3, hydroxyl groups per molecule and an average hydroxyl equivalent weight of from about 500 to about 2200, preferably from about 600 to about 2000, or a mixture of such polyols;

(B) a relatively low molecular weight polyol having an average of from about 2 to about 8, preferably from 2 to about 3, hydroxyl groups per molecule and an average equivalent weight of from about 31 to about 230, preferably from about 31 to about 200, or a mixture of such polyols;

(C) an organic polyisocyanate or polyisothiocyanate having an average of from about 2 to about 4NCX (each X being independently O or S) groups per molecule or a mixture of such isocyanates or isothiocyanates; and (D) a filler component comprising
 (1) an inorganic filler component comprising
  (a) hydrated alumina,
  (b) lead-containing compound,
  (c) antimony compound, and wherein component (a) is present in quantities of from about 10 to about 55, preferably from about 21 to about 45 percent by weight of the combined weight of the components of (D-1); component
  (b) is present in quantities of from about 0.01 to about 2, preferably from about 0.05 to about 1.5, percent by weight of the combined weight of the components of (D-1); and component
  (c) is present in quantities of from about 46 to about 90, preferably from about 52 to about 77, percent by weight of the combined weight of the components of (D-1); and such compounds have an average particle size of from about 0.02 to about 18 microns and an average surface area of from about 0.7 to about 75 $m^2/gram$;
 (2) a halogen-containing resin containing at least about 85%, preferably at least about 65%, halogen by weight and an average particle size of from about 9 to about 60 microns;

with the proviso that (a) if it is desired that the urethane backed carpet pass the Vertical Flammability Test employing a flame temperature of greater than about 1550° F. (843° C.), then component (D-1) also contains a hydrated zinc compound in an amount of from about 12 to about 40, preferably from about 16 to about 27, percent by weight of the combined weight of the components of (D-1), and (b) if the carpet substrate is a woven substrate and has a stitch rate of at least 50 tufts per square inch (7.55 tufts per square centimeter) then a sufficient quantity of (E) an organometallic viscosity reducing agent is employed to provide a mixture of components (A), (B), (D) and (E) with a viscosity of less than about 14,000 centipoise (14 Pa.s), preferably from about 11,000 to about 12,500 centipoise (11-12.5 Pa.s) at 33° C.; and wherein (1) components (A) and (B) are present in quantities such that the ratio of the number of hydroxyl equivalents contributed by component (B) to the number of hydroxyl equivalents contributed by component (A) is from about 0.8:1 to about 5.5:1, preferably from about 0.8:1 to about 4:1;

(2) components (A), (B) and (C) are present in quantities so as to provide an NCX to OH ratio of from about 0.95:1 to about 1.5:1, preferably from about 1:1 to about 1.25:1;

(3) component (D-1) is present in quantities of from about 20 to about 60, preferably from about 30 to about 50, percent by weight based upon the combined weight of components A, B and D; and (4) component (D-2) is present in quantities of from about 10 to about 35, preferably from about 15 to about 30, percent by weight based on the combined weight of components, A, B and D.

The present invention is also directed to a carpet comprising (I) a primary backing; (II) a yarn tufted or woven through said primary backing thereby creating a yarn bundle on the underside of the resultant tufted or woven greige good and (III) a polyurethane composition applied to the underside thereby encapsulating the yarn bundles and adhering the yarn bundles to the primary backing; said polyurethane composition comprising the catalyzed reaction product of a mixture comprising (A) a relatively high molecular weight polyether polyol having an average of from 2 to about 8, preferably from 2 to about 3, hydroxyl groups per molecule and an average hydroxyl equivalent weight of from about 500 to about 2200, preferably from about 600 to about 2000, or a mixture of such polyols;

(B) a relatively low molecular weight polyol having an average of from about 2 to about 8 hydroxyl groups per molecule and an average equivalent weight of from about 31 to about 230, preferably from about 31 to about 200, or a mixture of such polyols;

(C) an organic polyisocyanate or polyisothiocyanate having an average of from about 2 to about 4 NCX (each X being independently O or S) groups per molecule or a mixture of such isocyanates or isothiocyanates; and (D) a filler component comprising
  (1) an inorganic filler component comprising
    (a) hydrated alumina,
    (b) lead-containing compound,
    (c) an antimony-containing compound; and
wherein component (a) is present in quantities of from about 10 to about 55, preferably from about 21 to about 45, percent by weight of the combined weight of the components of (D-1); component (b) is present in quantities of from about 0.01 to about 2, preferably from about 0.05 to about 1.5, percent by weight of the combined weight of the components of (D-1); component (c) is present in quantities of from about 46 to about 90, preferably from about 52 to about 77, percent by weight of the combined weight of the components of (D-1); and such compounds have a particle size of from about 0.02 to about 18 microns, and a surface area of from about 0.7 to about 75 m$^2$/gram;
  (2) a halogen-containing resin containing at least about 85%, preferably at least about 65%, halogen by weight and a particle size of from about 9 to about 60 microns; and
with the proviso that (a) if it is desired that the urethane backed carpet passes the Vertical Flammability Test employing a flame temperature of greater than about 1550° F. (843° C.), then component (D-1) also contains a hydrated zinc compound in an amount of from about 12 to about 40, preferably from about 16 to about 27, percent by weight of the combined weight of the components of (D-1), and (b) if the carpet substrate is woven and has a stitch rate of at least 50 tufts per square inch (7.75 tufts per square centimeter) then a sufficient quantity of (E) an organometallic viscosity reducing agent is employed to provide a mixture of components (A), (B), (D) and (E) with a viscosity of less than about 14,000 centipoise (14 Pa.s), preferably from about 11,000 to about 12,500 centipoise (11–12.5 Pa.s) at 33° C.; and wherein (1) components (A) and (B) are present in quantities such that the ratio of the number of hydroxyl equivalents contributed by component (B) to the number of hydroxyl equivalents contributed by component (A) is from about 0.8:1 to about 5.5:1, preferably from about 0.8:1 to about 4:1.

(2) components (A), (B) and (C) are present in quantities so as to provide an NCX to OH ratio of from about 0.95:1 to about 1.5:1, preferably from about 1:1 to about 1.25:1.

(3) component (D-1) is present in quantities of from about 20 to about 60, preferably from about 30 to about 50, percent by weight based upon the combined weight of components A, B and D;

(4) component (D-2) is present in quantities of from about 10 to about 35, preferably from about 15 to about 30, percent by weight based on the combined weight of components, A, B and D; and The present invention is also directed to an additive composition comprising (A) from about 50 to about 80, preferably from about 55 to about 75, percent by weight of an inorganic filler component comprising
  (1) hydrated alumina,
  (2) lead-containing compound;
  (3) an antimony-containing compound;
  (4) hydrated zinc compound and wherein component (1) is present in quantities of from about 10 to about 55, preferably from about 21 to about 45, percent by weight of the combined weight of the components of (A); component (2) is present in quantities of from about 0.01 to about 2, preferably from about 0.05 to about 1.5, percent by weight of the combined weight of the components of (A); component (3) is present in quantities of from about 46 to about 90, preferably from about 52 to about 77, percent by weight of the combined weight of the components of (A); and component (4) is present in quantities of from about zero to 40, preferably from about 16 to 27, percent by weight of the combined weight of the components of (A); and such compounds have a particle size of from about 0.02 to about 18 microns, and a surface area of from about 0.7 to about 75 m$^2$/gram; and (B) from about 25 to about 55, preferably from about 30 to about 50, percent by weight of a halogen-containing resin containing at least about 85%, preferably at least about 65%, halogen by weight and a particle size of from about 9 to about 60 microns.

DESCRIPTION OF THE PREFERRED EMBODIMENTS

Suitable relatively high molecular weight polyether polyols which can be employed in the present invention include adducts of one or more compounds containing 2 to 8 hydroxyl groups per molecule and one or more hydrocarbylene or halogen substituted hydrocarbylene oxides.

Suitable hydroxyl-containing compounds include those having from about 2 to about 20, preferably from about 2 to about 6, carbon atoms such as, for example, water, ethylene glycol, diethylene glycol, propylene glycol, 1,2-butane diol, 1,3-butane diol, 1,4-butane diol, glycerine, trimethylol propane, p,p'-isopropylidine diphenol, mixtures thereof and the like.

Suitable hydrocarbylene or halogen substituted hydrocarbylene oxides which can be employed to prepare polyether polyols include those having from 2 to about 12, preferably from 2 to about 4, carbon atoms such as, for example, ethylene oxide, propylene oxide, 1,2-butylene oxide, 2,3-butylene oxide, styrene oxide, epichlorohydrin, epibromohydrin, 3-methyl-1,2-butylene oxide, 3,3,-dimethyl-1,2-butylene oxide, mixtures thereof and the like.

Other relatively high molecular weight polyols which can be employed herein include polymer-containing polyols such as, for example, those disclosed in U.S. Pat. Nos. RE. 29,118 (Stamberger), 28,715 (Stamberger), 29,014 (Pizzini et al) and U.S. Pat. No. 3,869,413 (Blankenship et al) all of which are incorporated herein by reference.

Suitable low molecular weight polyols include, for example, ethylene glycol, propylene glycol, 1,3-propane diol, 1,4-butane diol, dipropylene glycol, diethylene glycol, triethylene glycol, tetraethylene glycol, tripropylene glycol, tetrapropylene glycol, heptapropylene glycol, mixtures thereof and the like.

Also suitable as low molecular weight polyols are adducts of initiator compounds having from 2 to about 8 active hydrogen atoms per molecule and a hydrocarbylene oxide as hereinbefore described so long as the resultant adduct has the desired equivalent weight for the low equivalent weight polyol.

Particularly suitable initiator compounds include, for example, water, ethylene glycol, propylene glycol, glycerine, trimethylol propane, aniline, ammonia, ethylene diamine, diethylenetriamine, aminoethylethanolamine, pentaerythritol, glucose, fructose, sucrose, sorbitol, mixtures thereof and the like.

When adducts of initiator compounds having more than about 8 active hydrogen atoms per molecule are employed, they must be employed in admixture with polyols having less than about 8 hydroxyl groups per molecule in quantities so as to result in an average of from 2 to about 8 hydroxyl groups per molecule.

Suitable organic polyisocyanates include, for example, 2,4-toluenediisocyanate, 2,6-toluenediisocyanate, xylylenediisocyanate, p,p'-diphenylmethanediisocyanate, p-phenylenediisocyanate, naphthalenediisocyanate, dianisodine diisocyanate, polymethylene polyphenylisocyanate, hexamethylenediisocyanate, mixtures thereof and the like.

Also suitable are the isocyanate terminated prepolymers prepared from one or more of the above mentioned polyisocyanates and one or more of the above mentioned polyols.

Suitable also are the trimerized diisocyanates and crude diisocyanates.

Also suitable are the corresponding polyisothiocyanates, including isothiocyanate terminated prepolymers.

Suitable catalysts which can be employed include, for example, tertiary amines, organometallic compounds, particularly metal carboxylates, mixtures thereof and the like.

Particularly suitable catalysts include, for example, di-n-butyl tin-bis(mercaptoacetic acid isooctyl ester), dimethyl tin dilaurate, dibutyl tin dilaurate, stannous octoate, lead octoate, triethylene diamine, N-methyl morpholine, mixtures thereof and the like.

Suitable hydrated antimony-containing inorganic compounds which can be employed herein include, for example, antimony oxide, antimony chloride, antimony sulfide, antimonyl potassium tartrate, mixtures thereof and the like.

Particularly suitable are those antimony compounds commercially available from Harshaw Chemical Company as antimony trioxide, KR Grade, and Mallinckrodt Chemical Company as antimony trioxide, code 0216.

When such commercially available antimony-containing compounds do not contain a sufficient quantity of an inorganic lead compound, then a lead-containing compound is added to make up the deficiency. Suitable such inorganic lead-containing compounds which can be employed herein include, for example, lead oxide, lead chloride, lead bromide, lead nitrate, lead sulfate, mixtures thereof and the like.

Suitable halogen-containing resins which can be employed herein include polymers and copolymers of vinyl chloride and vinylidene chloride and such comonomers as methyl acrylate, methylmethacrylate, ethyl acrylate, ethyl methacrylate, vinyl acetate, crotonic acid, n-butyl acrylate and the like. Particularly suitable are copolymers of vinyl chloride and vinylidene chloride.

Suitable organo-metallic viscosity reducing agents which can be employed herein include, for example, organic titanates such as those commercially available from Kenrich Petrochemicals Incorporated as KR-41B, KR-46B, KR-55, KR-TTS, KR-138S, KR-9S, mixtures thereof and the like.

The polyurethane backing can be either foamed or unfoamed. In those instances where foaming is desired, such can be accomplished by using the inert gas frothing technique or the volatile liquid blowing agent technique or combinations thereof in conjunction with a surface active agent such as the commercially available block polysiloxane-polyoxyalkylene copolymers.

Suitable primary backing materials which can be employed in the present invention include those prepared from, for example, jute, polypropylene, nylon, polyesters, polyacrylates and the like.

Suitable yarns which can be tufted into the primary backing include those prepared from, for example, wool, nylon, polyester, acrylic, cotton, polypropylene, polyethylene, blends thereof and the like.

The polyurethane-forming composition can be applied to the substrate in a frothed or unfrothed condition. A polyurethane-forming froth is obtained by mechanically inducing an inert gas into the foam-forming composition. This is readily accomplished by a mixer such as a hand kitchen mixer fitted with a blade designed to mechanically whip or blend air or the inert gas into the mixture of urethane-forming components such as the type of blade employed in preparing whipped cream or for preparing meringue from egg whites or the like. Another method, which is more readily adaptable to large scale production is by feeding a stream composed of a mixture of the urethane-forming components or separate streams of the urethane-forming components and a stream of air or other inert gas into a suitable froth generator-mixer such as, for example, an Oakes foamer whereupon the frothed composition which emerges from the froth generator-mixer is directed onto the underside of the tufted or woven primary backing whereupon the froth composition thermosets into a flexible polyurethane foam.

Still another method is to feed the inert gas and all of the urethane-forming components except for the catalyst into the froth generator-mixer and subsequently mixing the catalyst with the resultant froth in a suitable mixer such as a static mixer and then directing the resultant catalyst-containing froth onto the underside of the tufted primary backing.

Suitable inert gaseous substances which are employed in the present invention include any gaseous element, compound, or mixture thereof which exist in the gaseous state under standard conditions of temperature and pressure i.e. 25° C. and 1 atmosphere (101 kPa), including for example, xenon, helium, carbon dioxide, nitrogen, oxygen, propane, methane, ethane or mixtures thereof such as, for example, air and the like, provided such does not react with any of the urethane forming components.

The following examples are illustrative of the invention, but are not to be construed as to limiting the scope thereof in any manner.

MEASUREMENTS OF THE VISCOSITY OF THE REACTING COMPOSITION

The viscosity of the catalyzed composition is measured using a Brookfield LVF using a #3 spindle rotating at 6 revolutions per minute (0.1 revolutions per second). The time to reach 20,000 centipoise (20 Pa.s) is noted for a particular composition.

PROCEDURE FOR PREPARING THE COMPOSITION FOR VISCOSITY MEASUREMENT OR FOR COATING CARPET

To a one quart paper cup 100 grams of the desired polyol mixture is added. The appropriate amount of titanate is then added on the polyol side and mixed. The desired amount of filler is mixed, using a high speed stirrer, into the polyol mixture. The appropriate amount of isocyanate is added and mixed similarly for an additional 90 seconds or until the temperature of the uncatalyzed composition reaches 93° F.,±1° F. (33.9° C.±0.56° C.). The appropriate amount of catalyst is added and mixed for an additional 30 seconds. The catalyzed composition is either doctored onto the back of the Executive Council carpeting within 45 seconds from the time of addition of the catalyst and cured for eight minutes (480 seconds) at 120° C. or the time from the addition of the catalyst to a viscosity of 20,000 centipoise (20 Pa.s) is measured with the viscometer.

The following components were employed in the examples.

ANTIMONY COMPOUND A is antimony trioxide containing about 920 ppm (parts per million) lead by weight, has an average particle size of about 1.2 microns, an average oil absorption value of about 10 g oil/100 g organic and is commercially available from The Harshaw Chemical Company as antimony trioxide, KR grade.

ANTIMONY COMPOUND B is antimony trioxide containing about 130 ppm lead by weight and is commercially available from Mallinckrodt Chemical Company as antimony trioxide, code 0216.

HYDRATED ALUMINA COMPOUND A is alumina trihydrate and has an average particle size of about 22 microns, an average oil absorption value of about 20 g oil/100 g organic and is commercially available from Kaiser Aluminum Company as Aluminum Trihydrate H36U.

HYDRATED ZINC COMPOUND A is zinc borate heptahydrate and has an average particle size of about 2-10 microns, an average oil absorption value of about 45 g oil/100 g organic and is commercially available from United States Borax and Chemical Corporation as Firebrake Zinc Borate.

LEAD COMPOUND A is lead oxide and has an average particle size of about 11.0 microns, an average acid absorption value of about 3.7 g acid/100 g oxide and is commercially available from Eagle-Picher Industries Incorporated as Lead Oxide (Litharge No. 28).

HALOGEN-CONTAINING RESIN A is a copolymer containing 10 percent vinyl chloride and 90% percent vinylidene chloride by weight which contains 70% chlorine by weight and has an average particle size of about 9-14 microns.

VISCOSITY REDUCING AGENT A is an organic titanate commercially available from Kenrich Petrochemicals Incorporated as KR-46B.

POLYOL A is a polyoxypropylene glycol having an average molecular weight of about 2000, an average hydroxyl equivalent weight of about 1000 and an average hydroxyl functionality of about 2.

POLYOL B is dipropylene glycol having a molecular weight of about 134, a hydroxyl equivalent weight of about 67 and a hydroxyl functionality of 2.

POLYISOCYANATE A is a prepolymer prepared by reacting (1) 76.8 grams of an 80/20 mixture of 2,4-/2,6-toluene diisocyanate having an average NCO equivalent weight of about 87 and an average NCO functionality of about 2; (2) 14.7 grams of polyoxyethylene glycol having an average molecular weight of about 200, an average hydroxyl equivalent weight of about 100 and an average hydroxyl functionality of about 2 and (c) 8.5 grams of a glycerine initiated polyether triol prepared from glycerine and propylene oxide and having an average molecular weight of about 260, and an average hydroxyl equivalent weight of about 87 and an average hydroxyl functionality of about 3. The prepolymer had an NCO content of about 26.8 weight percent and an average NCO equivalent weight of about 156.7.

CATALYST A is an organotin catalyst commercially available from Witco Chemical Company as FOMREZ® UL-28.

SUBSTRATE A (Executive Council) is a tufted carpet substrate manufactured by Trend Carpet Mill having a greige weight of 31 oz/yd$^2$ (1051 g/m$^2$) and a stitch rate of about 64 tufts/in$^2$ (9.92 tufts/cm$^2$).

SUBSTRATE B (Bigelow) is a woven carpet substrate manufactured by Bigelow Sanford have a greige weight of 35 oz/yd$^2$ (1187 g/m$^2$) and a stitch rate of about 72 tufts/in$^2$ (11.16 tufts/cm$^2$).

SUBSTRATE C is a woven carpet substrate manufactured by Mohasco Carpet Mill having a greige weight of 38.5 oz/yd$^2$ (1305 g/m$^2$) and a stitch rate of about 22.5 tufts/in$^2$ (3.49 tufts/cm$^2$).

Unless otherwise indicated, any reference to "flammability test" refers to the vertical test specified in Federal Test Method Standard 191, Method 5903.2, which is described in Appendix F to FAR, Part 25, Chapter 4. References herein as to passing or failing are based upon the following: For a specimen to be considered herein as passing this test, it must have an average char length of not greater than 8 inches (20.32 cm), an average afterglow of not greater than 5 seconds and an afterflame of not greater than 15 seconds.

EXAMPLE 1

To a 400 ml tripour beaker was charged and mixed 85 grams of polyol A and 15 grams of polyol B. To the polyol mixture was added and mixed 60 grams of antimony compound A, 30 grams of hydrated alumina compound A, and 60 grams of halogen-containing polymer A. To the filler/polyol mixture was blended 60 grams of polyisocyante A. The urethane forming composition has an NCO:OH ratio of 1.25:1. To the mixture was added 0.2 grams of catalyst A. The reaction mixture was blended until homogeneous and "doctored" onto the back of substrate A and allowed to cure at 120° C. for 8 minutes (480 seconds).

The carpet sample had a urethane coating weight of about 35 oz/yd$^2$ (1186.7 g/m$^2$). The carpet had a tuft lock strength of about 22 pounds (9.98 kg) and possessed sufficient flame suppressing characteristics to pass the vertical flammability test at 1550° F. (843° C.).

COMPARATIVE EXPERIMENT A

The procedure of example 1 was followed employing the following components.
 85 pbw polyol A
 15 pbw polyol B
 30 pbw hydrated alumina A
 175 pbw calcium carbonate
 60 pbw polyisocyanate A 0.2 pbw catalyst A
The NCO:OH ratio was 1.25:1.

This composition was mixed until homogeneous and applied to the back of the same substrate employed in example 1 and allowed to cure at 120° C. for 8 minutes (480 seconds). The performance is presented below as well as that of the previous sample (example 1).

| PROPERTIES | EXAMPLE 1 | COMPARATIVE EXPERIMENT A |
|---|---|---|
| Coating Weight, oz/yd$^2$ (g/m$^2$) | 35.0 (1187) | 35.4 (1200) |
| Tuft lock strength, lbs. (kg) | 22.0 (9.98) | 19.6 (8.89) |
| Flammability Test* | Passed | Failed |
| Average char length, in. (cm.) | 2.5 (6.35) | >8.0 (20.32) |
| Average afterflame, sec. | 0 | >60.0 |
| Average afterglow, sec. | 0 | 0 |

*THE ABOVE DATA PERTAINING TO THE FLAMMABILITY TEST IS NOT INTENDED TO REFLECT THE HAZARDS PRESENTED BY THIS OR ANY OTHER MATERIAL UNDER ACTUAL FIRE CONDITIONS.

EXAMPLES 2 THRU 8 AND COMPARATIVE EXPERIMENTS B THRU M

These examples and comparative experiments were prepared in a manner similar to example 1. Unless otherwise noted, the ratio of the polyol and polyisocyanate components were the same. Also, the polyols and polyisocyanate components were the same. The filler components, substrate employed and results are provided in the following Table.

| | EXAMPLE 2 | COMP. EXPT. B | COMP. EXPT. C | EXAMPLE 3 | COMP. EXPT. D | COMP. EXPT. E | EXAMPLE 4 |
|---|---|---|---|---|---|---|---|
| Filler | | | | | | | |
| Antimony, type/pbw$^1$ | A/60 | A/150 | None | A/60 | A/85 | None | A/60 |
| Zinc, type/pbw | None | None | None | A/20 | None | None | A/20 |
| Alumina, type/pbw | A/30 | None | A/80 | A/30 | None | A/170 | A/30 |
| Lead, type/pbw | None | None | None | None | None | None | None |
| Chlorine-containing polymer, type/pbw | A/60 | None | A/80 | A/60 | A/85 | None | A/60 |
| Viscosity reducing agent, type/pbw | None | None | None | A/1 | A/1 | None | None |
| Substrate, type | A | A | A | B | B | B | C |
| *Flammability test$^2$ | | | | | | | |
| temperature, °F./°C. | 1550/843 | 1550/843 | 1550/843 | 2200/1204 | 2200/1204 | 2200/1204 | 2200/1204 |
| afterflame, sec. | None | >60 | >60 | None | >60 | >60 | None |
| afterglow, sec. | None | None | None | None | None | >5 | None |
| char length, in./cm. | 1.5/3.8 | 8/20.3 | 12/30.5 | 2.2/5.6 | 6.3/16 | 23/30.5 | 2.2/5.6 |
| pass or fail | Pass | Fail | Fail | Pass | Fail | Fail | Pass |

| | COMP. EXPT. F | COMP. EXPT. G | COMP. EXPT. H | EXAMPLE 5 | COMP. EXPT. I | EXAMPLE 6 | EXAMPLE 7$^3$ |
|---|---|---|---|---|---|---|---|
| Filler | | | | | | | |
| Antimony, type/pbw$^1$ | None | A/170 | None | A/60 | B/60 | B/60 | A/60 |
| Zinc, type/pbw | None | None | A/170 | None | None | None | A/20 |
| Alumina, type/pbw | A/170 | None | None | A/30 | A/30 | A/30 | A/30 |
| Lead, type/pbw | None | None | None | None | None | A/1.2 | None |
| Chlorine-containing polymer, type/pbw | None | None | None | A/60 | A/60 | A/60 | A/60 |
| Viscosity reducing agent, type/pbw | None | None | A/1 | None | None | None | A/1 |
| Substrate, type | C | C | C | A | A | A | B |
| *Flammability test$^2$ | | | | | | | |
| temperature °F./°C. | 2200/1204 | 2200/1204 | 2200/1204 | 1550/843 | 1550/843 | 1550/843 | 2200/1204 |
| afterflame, sec. | >60 | >60 | >60 | None | 40.6 | None | None |
| afterglow, sec. | >5 | >5 | >5 | None | None | None | None |
| char length, in./cm. | 12/30.5 | 12/30.5 | 12/30.5 | 1.5/3.8 | 6.5/23 | 2.5/6.4 | 2.2/5.6 |
| pass or fail | Fail | Fail | Fail | Pass | Fail | Pass | Pass |

| | COMP. EXPT. J | COMP. EXPT. K | EXAMPLE 8 | COMP. EXPT. L | COMP. EXPT. M |
|---|---|---|---|---|---|
| Filler | | | | | |
| Antimony, type/pbw$^1$ | A/60 | A/60 | A/60 | A/60 | A/40 |
| Zinc, type/pbw | A/10 | A/50 | A/20 | None | A/20 |
| Alumina, type/pbw | A/30 | None | A/30 | A/30 | A/30 |
| Lead, type/pbw | None | None | None | None | None |
| Chlorine-containing polymer, type/pbw | A/60 | A/60 | A/60 | A/60 | A/60 |
| Viscosity reducing agent, type/pbw | A/1 | A/1 | None | None | None |
| Substrate, type | B | B | C | C | C |
| *Flammability test$^2$ | | | | | |
| temperature, °F./°C. | 2200/1204 | 2200/1204 | 2200/1204 | 2200/1204 | 2200/1204 |
| afterflame, sec. | >60 | >60 | None | 18 | 28 |
| afterglow, sec. | None | None | None | None | None |
| char length, in./cm. | 3.9/38.6 | 2.95/7.5 | 2.2/5.6 | 2.2/5.6 | 1.6/4.1 |

| pass or fail | Fail | Fail | Pass | Fail | Fail |

*THE ABOVE DATA PERTAINING TO THE FLAMMABILITY TEST IS NOT INTENDED TO REFLECT THE HAZARDS PRESENTED BY THIS OR ANY OTHER MATERIAL UNDER ACTUAL FIRE CONDITIONS.

FOOTNOTES TO TABLE
[1] pbw is parts by weight based upon weight of polyol components.
[2] The above data pertaining to the flammability test is not intended to reflect the hazards presented by this or any other material under actual fire conditions.
[3] 1 pbw catalyst was employed instead of 2 pbw.

We claim:

1. A polyurethane composition for providing a unitary backing for tufted or woven carpets which comprises the catalyzed reaction product of a polyurethane forming mixture comprising
   (A) a relatively high molecular weight polyether polyol having an average of from 2 to about 8 hydroxyl groups per molecule and an average hydroxyl equivalent weight of from about 500 to about 2200 or a mixture of such polyols;
   (B) a relatively low molecular weight polyol having an average of from about 2 to about 8 hydroxyl groups per molecule and an average equivalent weight of from about 31 to about 230 or a mixture of such polyols;
   (C) an organic polyisocyanate or polyisothiocyanate having an average of from about 2 to about 4NCX (each X being independently O or S) groups per molecule or a mixture of such isocyanates or isothiocyanates; and
   (D) a filler component comprising
      (1) an inorganic filler component comprising
         (a) hydrated alumina,
         (b) lead-containing compound,
         (c) antimony compound, and wherein component (a) is present in quantities of from about 10 to about 55 percent by weight of the combined weight of the components of (D-1); component (b) is present in quantities of from about 0.01 to about 2 percent by weight of the combined weight of the components of (D-1); component (c) is present in quantities of from about 46 to about 90 percent by weight of the combined weight of the components of (D-1) and such compounds have an average particle size of from about 0.02 to about 18 microns, and an average surface area of from about 0.7 to about 75 m²/gram;
      (2) a halogen-containing resin containing at least about 85% halogen by weight and an average particle size of from about 9 to about 60 microns;
with the proviso that (a) if it is desired that the urethane backed carpet pass the Vertical Flammability Test employing a flame temperature of greater than about 1550° F. (843° C.), then component (D-1) also contains a hydrated zinc compound in an amount of from about 12 to about 40 percent by weight of the combined weight of the components of (D-1), and (b) if the carpet substrate is woven and has a stitch rate of at least 50 tufts per square inch (7.55 tufts per square centimeter) then a sufficient quantity of
   (E) an organometallic viscosity reducing agent is employed to provide a mixture of components (A), (B), (D) and (E) with a viscosity of less than about 14,000 (14 Pa.s) centipoise at 33° C.; and wherein
      (1) components (A) and (B) are present in quantities such that the ratio of the number of hydroxyl equivalents contributed by component (B) to the number of hydroxyl equivalents contributed by component (A) is from about 0.8:1 to about 5.5:1,
      (2) components (A), (B) and (C) are present in quantities so as to provide an NCX to OH ratio of from about 0.95:1 to about 1.5:1;
      (3) component (D-1) is present in quantities of from about 20 to about 60 percent by weight based upon the combined weight of components A, B and D; and
      (4) component (D-2) is present in quantities of from about 10 to about 35 percent by weight based on the combined weight of components A, B and D.

2. A composition of claim 1 wherein
   (a) component (A) has an average of from about 2 to about 3 hydroxyl groups per molecule and an average hydroxyl equivalent weight of from about 600 to about 2000;
   (b) component (B) has an average of from about 2 to about 3 hydroxyl groups per molecule and an average hydroxyl equivalent weight of from about 31 to about 200;
   (c) component (D-1-a) is present in quantities of from about 21 to about 45 percent;
   (d) component (D-1-b) is present in quantities of from about 0.05 to about 1.5 percent;
   (e) component (D-1-c) is present in quantities of from about 52 to about 77 percent;
   (f) component (D-2) contains at least about 65 percent halogen;
   (g) component (A) and (B) are present in quantities such that the ratio of the number of hydroxyl equivalents contributed by component (B) to the number of hydroxyl equivalents contributed by component (A) is from about 0.8:1 to about 4:1;
   (h) components (A), (B) and (C) are present in quantities so as to provide an NCX to OH ratio of from about 1:1 to about 1.25:1;
   (i) component (D-1) is present in quantities of from about 30 to about 50 percent by weight based upon the combined weight of components (A), (B) and (D);
   (j) component (D-2) is present in quantities of from about 15 to about 30 percent by weight based upon the combined weight of components (A), (B) and (D); and
   (k) component (E), if present, is in quantities which provides a mixture of components (A), (B) and (D) with a viscosity of from about 11,000 to about 12,500 (11–12.5 Pa.s) centipoise at 33° C.

3. A composition of claim 2 wherein
   (a) in component (C) each X is oxygen;
   (b) in component (D-2), said halogen is chlorine.

4. A composition of claim 3 wherein
   (a) component (D-1-a) is alumina trihydrate;
   (b) component (D-1-b) is lead oxide;
   (c) component (D-1-c) is antimony oxide; and
   (d) component (D-2) is a copolymer of vinyl chloride and vinylidene chloride.

5. A composition of claims 1, 2, 3, or 4 wherein componenet (D-1) also contains a hydrated zinc compound in a quantity of from about 12 to about 40 percent by weight of the combined weight of the components of (D-1).

6. A composition of claim 5 wherein component (D-1) contains from about 16 to about 27 percent hydrated zinc compound by weight.

* * * * *